United States Patent Office 3,846,253
Patented Nov. 5, 1974

3,846,253
DISTILLATION OF CHLORINATED HYDROCARBONS WITH ALKALI METAL MATERIAL ADDITION
Robert Paul Obrecht, Orinda, Calif., assignor to Stauffer Chemical Company, New York, N.Y.
Filed Dec. 6, 1971, Ser. No. 208,029
Int. Cl. C07c *19/00, 17/38*
U.S. Cl. 203—7                                    14 Claims

ABSTRACT OF THE DISCLOSURE

Process for the purification of organic chlorinated compounds containing two or more carbon atoms, characterized by employment of an alkali metal material in an amount sufficient to reduce corrosion and prolong equipment life.

BACKGROUND OF THE INVENTION

Figure 1:
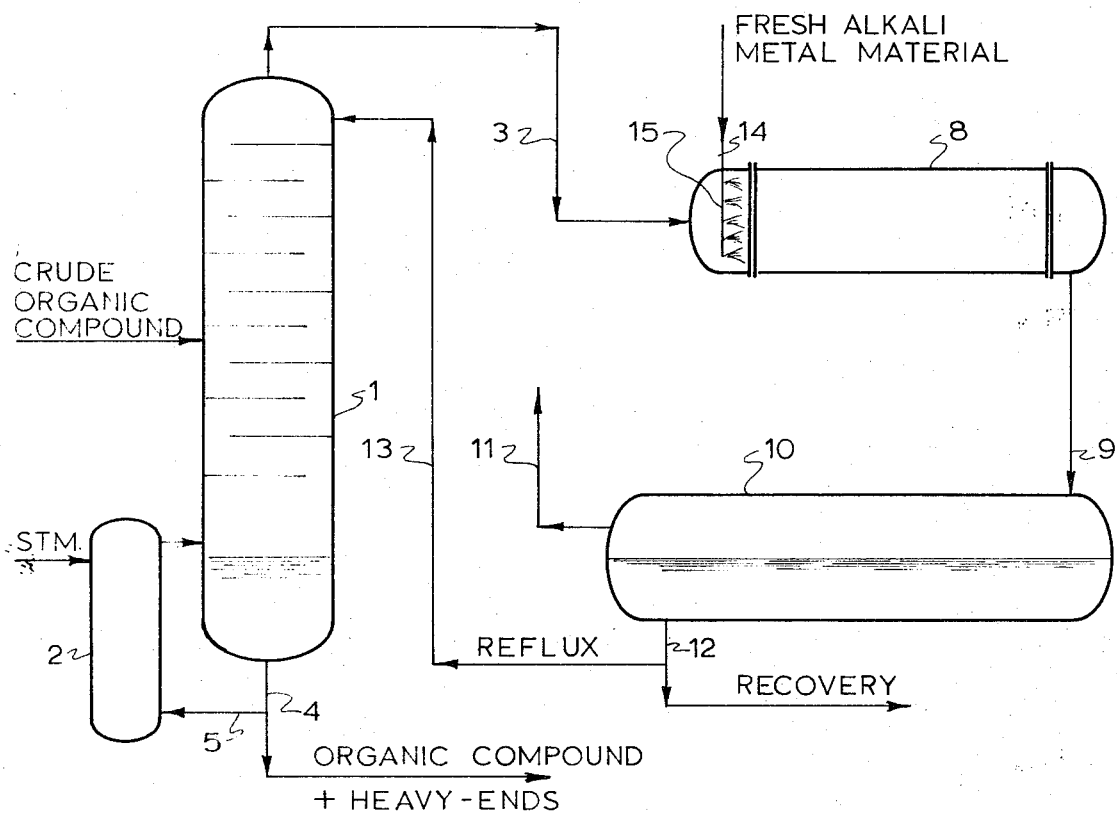

Many commercial processes for the chlorination of organic compounds, containing two or more carbon atoms, produce a crude, cooled product which may contain varying amounts of impurities such as other chlorinated compounds, water, HCl, and dissolved chlorine. In most processes the inorganic impurities are removed from the product by properly washing the crude, cooled product stream with an aqueous medium, decanting the aqueous phase, and then washing the organic product phase with dilute alkaline aqueous solution, followed by decanting of the alkaline aqueous medium. Chlorinated hydrocarbons of two or more carbon atoms, such as chloroalkyl or chloroalkenyl compounds containing 2 to 10 carbon atoms, are quite commonly purified by such a procedure. The essentially neutralized, wet crude chlorinated product stream is then ready for further purification and removal of the chlorinated organic compound impurities.

When undesired low-boiling organic impurities and minor amounts of water are present, as is often the case, the wet, neutral crude chlorinated product can be subjected to a combined azeotropic drying and low-boiling impurity removal method. This procedure is accomplished by feeding the crude, wet neutral organic compound or product to a fractional distillation zone, fractionally distilling the crude organic compound to separate the crude product into an overhead fraction containing low-boiling chlorinated organic impurities (so-called light-ends) and water, and a bottoms fraction containing primarily the chlorinated organic compound desired, and minor amounts of high-boiling chlorinated organic impurities (so-called heavy-ends). Crude ethylene dichloride is especially suited to such a procedure since the difference between its boiling point and those of commonly associated impurities is sufficient to allow removal of a major portion of light-end impurities in the overhead.

In this type of operation, the overhead is passed to a light-ends recovery zone where the low-boiling materials and water are condensed and accumulated. The light-ends may be recovered directly, passed for further purification, or recycled in whole or in part to the fractional distillation zone.

The occurrence of large scale corrosion pluggage and reduced equipment life has been a persistent problem in such units. While applicant does not wish to be bound by any particular theory of invention, it is postulated that breakdown of one or more of the thermally unstable chlorinated compounds present, with or without the presence of water, occurs at the operating temperatures in the fractional distillation zone, thus releasing small but troublesome amounts of HCl. This is believed to be true particularly at the bottom of the fractionation column where the temperature is at a maximum. As indicated, small amounts of HCl, and minute quantities of $Cl_2$, are believed to be driven to the top of the column, due to their vapor pressure, and are carried overhead. Since water is also present in the column and is removed in the overhead, the combination of HCl and water produces a dilute HCl (and hypochlorous acid if $Cl_2$ is present), and results in severe corrosion and reduced equipment life in the fractionation zone and especially in the light-ends recovery zone.

DETAILED DESCRIPTION OF THE INVENTION

The invention eliminates, or greatly reduces, the problems mentioned in the fractional distillation of cooled, essentially neutral organic chlorinated compounds by addition to the overhead fraction, at a point between the fractionation zone and the condensation zone, or to the condensation zone, of an effective amount of a solution of an alkali metal material selected from the group consisting of NaOH, KOH, LiOH, $Na_2CO_3$, $Li_2CO_3$, $K_2CO_3$, $NaHCO_3$, $KHCO_3$, $LiHCO_3$, and mixtures thereof. The invention is particularly adapted to processes involving the purification of streams containing principally chlorinated hydrocarbons having at least two or more carbon atoms, e.g. 2 to 10 carbon atoms, and is especially suited to processes for the purification of ethylene dichloride.

The amount of alkali metal material employed is expressed by the term "an effective amount," and is that amount sufficient to prevent or substantially inhibit corrosion and prolong equipment life. In general, an effective amount will be about a neutralizing amount (or greater) of the alkali metal material, and will normally be an amount at least stoichiometrically equivalent to the amount of HCl present in the system. The "effective amount" can be determined empirically by those of skill in the art. It is preferred to supply an excess of alkali metal material in solution to insure complete neutralization of the HCl, although mole ratios of from 0.8 moles of alkali metal (100 percent basis) material per mole of HCl to 10.0 moles of alkali metal material, or greater, per mole of HCl, may be employed.

Usually, the alkali metal material is supplied to the overhead fraction or the condensation zone in the form of a solution, preferably aqueous, containing from 0.05 to about 25 percent by weight of the alkali metal material. A preferred range of alkali metal material concentration is from about 0.75 percent by weight to about 5 percent by weight, while from about 1.0 percent by weight to about 3.0 percent by weight is most preferred. The amount of the alkali metal compound supplied as a solution will depend, inter alia, on the amount of HCl in the overhead fraction and the degree of control desired, counterbalanced by the cost of the material. In general, the alkali metal material may be supplied, in solution, as indicated, to the overhead or the condensation zone, at a rate of from about 0.75 gram mole per hour to about 65 gram moles per hour (dry basis) depending, of course, on HCl concentration, equipment limitations, etc. A preferred range of addition of the alkali metal material (dry basis) in the concentrations indicated, is from about 0.75 gram mole per hour to about 20 gram moles per hour, while from about 1 gram mole per hour to about 8 gram moles per hour (dry basis) is most preferred.

As noted, the alkali metal material is supplied to the light-ends recovery zone as a dilute solution, preferably aqueous, although, under certain circumstances, set out more fully hereafter, the material can be supplied as a solid. The preferred alkali metal materials are NaOH, $Na_2CO_3$, $NaHCO_3$ and mixtures thereof.

In order to describe the invention with greater particularity, reference is made to FIG. 1 of the accompanying drawing. Crude ethylene dichloride containing about 99.1 mole percent ethylene dichloride, about 0.5 mole percent $H_2O$, about 0.3 mole percent light ends, such as $C_2H_5Cl$, $CHCl_3$, $1,1\text{-}C_2H_4Cl_2$, and $C_2HCl_3$, and about 0.1 mole percent of so-called heavy-ends, such as $1,1,2\text{-}C_2HCl_3$ and chlorinated higher molecular weight hydrocarbons, is fed into a fractional distillation column 1 having reboiler 2 through which heat is supplied in the form of steam. In column 1, the crude ethylene dichloride is fractionally distilled to provide an overhead in line 3 containing approximately 0.9 mole percent $H_2O$ 34.8 mole percent $C_2H_5Cl$, 7.6 mole percent $CHCl_3$, 37.4 mole percent $1,1\text{-}C_2H_4Cl_2$, 13.6 mole percent $1,2\text{-}C_2H_4Cl_2$, 5.5 mole percent $C_2HCl_3$, and is believed, a small quantity of HCl, e.g., 0.002 mole percent. Ethylene dichloride containing a very minor fraction of high-boiling materials and $C_2HCl_3$ are taken off as bottoms from column 1 in line 4, a portion being returned through line 5 and reboiler 2 to provide heat to the system.

The overhead in line 3 is then fed into shell and tube condenser 8, where the light-ends are condensed and are passed through line 9 into accumulator 10. In accumulator 10, the water and water-soluble materials separate from the light-ends organic materials, the former being drawn off through line 11 to further use or waste, the light-ends being drawn off through line 12. The light-ends may be recovered directly, although normally a portion of the stream is sent through line 13 to provide reflux for the fractional distillation column 1.

In accordance with the invention, the alkali metal material, preferably NaOH, is introduced as a 1 to 3 percent (by weight) solution (preferably in water) through line or entrance 14 into header 15 of condenser 8 at a rate of about 6.4 moles per hour of alkali metal material (dry basis). Header 15 is positioned in the condenser 8 in a manner to provide a full spray on the tubes of condenser 8, as well as to provide intimate contact of the NaOH solution with the overhead stream. The alkali metal material in solution is believed to react with HCl present in the overhead, and the reaction products pass from the condenser with the condensed light-ends, etc., through line 9. Removal of the reaction products, e.g. NaCl and $H_2O$, with the condensed water from the overhead fraction is accomplished through line 11, and the steam may be recycled to line 14, if sufficiently alkaline. Where NaOH is employed as indicated, NaCl is removed from line 11 at a rate of about 0.66 moles per hour.

Figure 2:
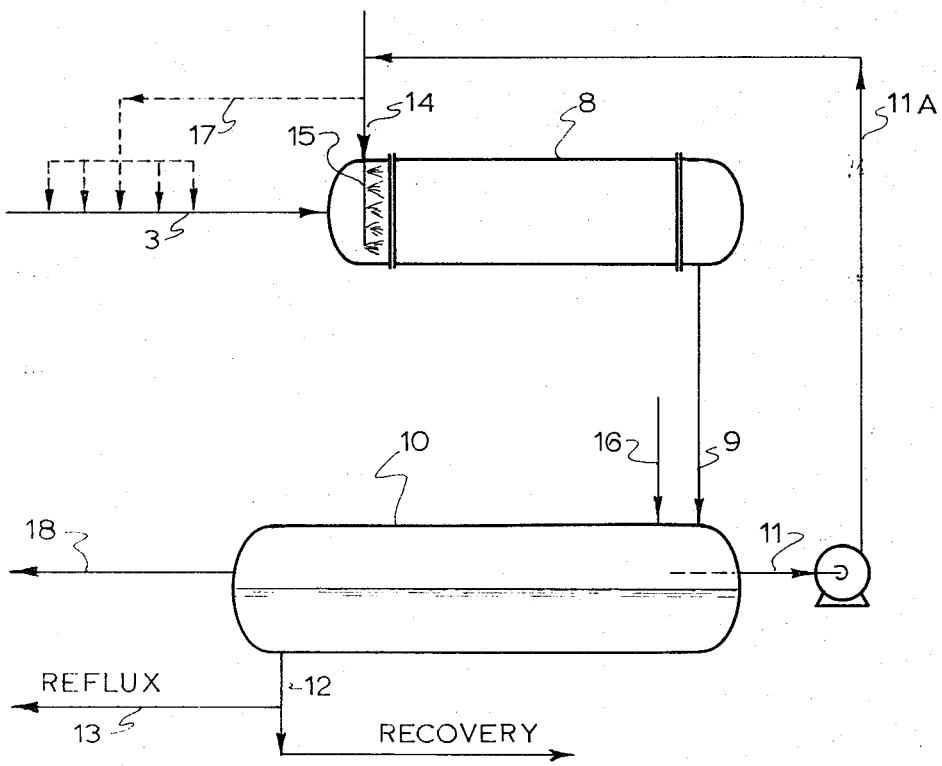

In the embodiment of FIG. 2, provision is made for admission of the alkali metal material into the system by line 16 which feeds into the accumulator 10. The alkaline solution is then pumped through lines 11 and 11A, through line 14, and through header 15. Alternately, the alkali metal solution may be added in the line from the distillation column, as shown at 17 (dotted lines). Obviously, make-up alkali metal material can be added at other points in the light-ends condensation and recovery zone, as for example, in line 11. Where the alkali metal material is admitted in line 11, provision should be made for bleed of the system prior to entry thereof, as for example, through line 18, to prevent buildup of reaction product (NaCl, etc.) in the system. The alkali metal material may be admitted in line 11 or 16 as a powdered solid if metering is precise and sufficient agitation is provided to insure good mixing and dissolution.

Similar results are obtained when the other mentioned alkali metal materials are employed, especially with $Na_2CO_3$ and $NaHCO_3$. Use of the method of the invention, in addition to the benefits indicated, also makes possible the employment of less-expensive materials of construction. Corrosion is materially reduced in mild steel equipment, and there is a substantial increase of equipment life in units fabricated with stainless steel and nickel alloys.

While the invention has been illustrated with respect to particular apparatus, those skilled in the art will appreciate that other equivalent or analogous units may be employed. For example, although a shell and tube condenser is shown, other condensers, such as a falling curtain condenser, may be employed. In another embodiment (not shown) the overhead may be contacted, prior to entry into the condenser, in a packed, well irrigated column featuring a countercurrent flow of the alkali metal material. Those skilled in the art can modify the entry of the alkali metal material into the particular apparatus employed to provide suitable coverage of the unit and contact with the overhead. Again, all pumps, valves, etc. have not been illustrated, as such expedients can readily be supplied by the skill of the art.

What is claimed is:

1. In a process for the purification of a chlorinated hydrocarbon containing 2 to 10 carbon atoms wherein the crude chlorinated hydrocarbon is passed to a light-ends fractional distillation zone to fractionally distill the crude chlorinated hydrocarbon and separate an overhead fraction containing low-boiling chlorinated hydrocarbon impurities and water, and a bottoms fraction containing the chlorinated hydrocarbon and a small amount of high boiling impurities, the overhead fraction is passed to a light-ends recovery zone comprising a condensation zone and a light-ends accumulation zone in communication with and following the condensation zone, and wherein the low-boiling chlorinated hydrocarbon impurities are condensed, accumulated, and separated from the water, and recovered, the improvement comprising, feeding an effective amount of an alkali metal material selected from the group consisting of NaOH, KOH, LiOH, $Na_2CO_3$, $K_2CO_3$, $Li_2CO_3$, $NaHCO_3$, $KHCO_3$, $LiHCO_3$, and mixtures thereof in solution to the overhead fraction at a point between the light-ends fractional distillation zone and the light-ends recovery zone.

2. The method of claim 1 wherein the chlorinated hydrocarbon is ethylene dichloride.

3. The method of claim 2 wherein the alkali metal material is fed in an amount stoichiometrically equivalent to or greater than the amount of any HCl present in the system.

4. The method of claim 3 wherein the alkali metal material is selected from the group consisting of NaOH, $NaHCO_3$, $Na_2CO_3$, and mixtures thereof.

5. The method of claim 4 wherein the alkali metal compound is fed as a solution having a concentration of from about 0.05 weight percent to about 25 weight percent alkali metal material.

6. The method of claim 4 wherein the alkali metal compound is fed as a solution having a concentration of from about 0.75 weight percent to about 5 weight percent alkali metal material.

7. The method of claim 4 wherein the alkali metal compound is fed as a solution having a concentration of from about 1.0 weight percent to about 3.0 weight percent alkali metal material.

8. In a process for the purification of a chlorinated hydrocarbon containing 2 to 10 carbon atoms wherein the crude chlorinated hydrocarbon is passed to a light-ends fractional distillation zone to fractionally distill the crude chlorinated hydrocarbon and separate an overhead fraction containing low boiling chlorinated hydrocarbon impurities and water, and a bottoms fraction containing the chlorinated hydrocarbon and a small amount of high boiling impurities, the overhead fraction is passed to a light-ends recovery zone comprising a condensation zone and light-ends accumulation zone in communication with and following the condensation zone, and wherein the low-boiling chlorinated hydrocarbon impurities are condensed, accumulated, and separated from the water, and recovered, the improvement comprising, feeding an effective amount of an alkali metal material selected from the group consisting of NaOH, KOH, LiOH, $Na_2CO_3$, $K_2CO_3$, $Li_2CO_3$, $NaHCO_3$, $KHCO_3$, $LiHCO_3$, and mixtures thereof in solution to the condensation zone.

9. The method of claim 8 wherein the chlorinated hydrocarbon is ethylene dichloride.

10. The method of claim 9 wherein the alkali metal material is fed in an amount stoichiometrically equivalent to or greater than the amount of any HCl present in the system.

11. The method of claim 10 wherein the alkali metal material is selected from the group consisting of NaOH, $NaHCO_3$, $Na_2CO_3$, and mixtures thereof.

12. The method of claim 11 wherein the alkali metal compound is fed as a solution having a concentration of from about 0.05 weight percent to about 25 weight percent alkali metal material.

13. The method of claim 11 wherein the alkali metal compound is fed as a solution having a concentration of from about 0.75 weight percent to about 5 weight percent alkali metal material.

14. The method of claim 11 wherein the alkali metal compound is fed as a solution having a concentration of from about 1.0 weight percent to about 3.0 weight percent alkali metal material.

References Cited

UNITED STATES PATENTS

| | | | |
|---|---|---|---|
| 3,660,248 | 5/1972 | Tsao | 203—7 |
| 2,908,640 | 10/1959 | Dougherty | 203—7 |
| 3,189,537 | 6/1965 | Carlton | 203—7 |
| 3,447,891 | 6/1969 | Crawford | 203—7 |
| 2,589,212 | 3/1952 | Agapetus et al. | 203—37 |

FOREIGN PATENTS

| | | | |
|---|---|---|---|
| 703,613 | 2/1965 | Canada | 203—37 |

WILBUR L. BASCOMB, JR., Primary Examiner

U.S. Cl. X.R.

203—33, 37; 260—652 P